US012806728B2

(12) United States Patent
Kaku

(10) Patent No.: US 12,806,728 B2
(45) Date of Patent: Nov. 24, 2026

(54) MACHINE TOOL SYSTEM

(71) Applicant: STAR MICRONICS CO., LTD., Shizuoka (JP)

(72) Inventor: Norio Kaku, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 410 days.

(21) Appl. No.: 18/408,192

(22) Filed: Jan. 9, 2024

(65) Prior Publication Data

US 2024/0139898 A1 May 2, 2024

Related U.S. Application Data

(63) Continuation of application No. PCT/JP2022/026450, filed on Jul. 1, 2022.

(30) Foreign Application Priority Data

Jul. 14, 2021 (JP) ................................ 2021-116566

(51) Int. Cl.
*B23Q 17/22* (2006.01)
*B23Q 3/155* (2006.01)
(Continued)

(52) U.S. Cl.
CPC ..... *B23Q 17/2225* (2013.01); *B23Q 3/15546* (2013.01); *B23Q 5/42* (2013.01);
(Continued)

(58) Field of Classification Search
CPC ............ G05B 19/4061; G05B 19/4069; G05B 2219/35316; G05B 19/402; G05B 19/404;
(Continued)

(56) References Cited

U.S. PATENT DOCUMENTS

| | | | | |
|---|---|---|---|---|
| 4,651,601 A * | 3/1987 | Sasaki | B21D 28/12 | 83/13 |
| 6,230,595 B1 * | 5/2001 | Kranjac | B23B 29/244 | 82/158 |

(Continued)

FOREIGN PATENT DOCUMENTS

| | | |
|---|---|---|
| CN | 1457278 A | 11/2003 |
| CN | 110193752 A | 9/2019 |

(Continued)

OTHER PUBLICATIONS

An Office Action dated Dec. 26, 2025 issued in corresponding CN Application No. 202280048899.7 with English translation, 15 pages.

(Continued)

*Primary Examiner* — Darrin D Dunn
(74) *Attorney, Agent, or Firm* — MUNCY, GEISSLER, OLDS & LOWE, P.C.

(57) ABSTRACT

A highly convenient machine tool system is provided. An NC lathe as an example of the machine tool system includes a first tool post to which a first tool for machining a workpiece is attached, a numerical control unit adapted to control a movement of the first tool post according to a numerical control program, and a scanner adapted to measure a position and a shape of the first tool attached to the first tool post brought to a predetermined position under control of the numerical control unit.

9 Claims, 12 Drawing Sheets

(51) Int. Cl.

| | |
|---|---|
| ***B23Q 5/04*** | (2006.01) |
| ***B23Q 5/42*** | (2006.01) |
| ***B23Q 11/10*** | (2006.01) |
| ***B23Q 15/013*** | (2006.01) |
| ***B23Q 17/00*** | (2006.01) |
| ***G05B 19/4061*** | (2006.01) |

(52) U.S. Cl.
CPC ......... *B23Q 15/013* (2013.01); *B23Q 17/003* (2013.01); *G05B 19/4061* (2013.01); *B23Q 5/045* (2013.01); *B23Q 11/1076* (2013.01)

(58) Field of Classification Search
CPC .......... G05B 2219/49141; B25J 9/1666; B25J 9/1671
See application file for complete search history.

(56) References Cited

U.S. PATENT DOCUMENTS

| | | | | |
|---|---|---|---|---|
| 6,438,445 | B1 * | 8/2002 | Yoshida | G05B 19/40937 700/173 |
| 6,571,671 | B1 * | 6/2003 | Giannetti | B23B 29/246 82/158 |
| 6,742,422 | B1 | 6/2004 | Shinohara et al. | |
| 7,847,506 | B2 * | 12/2010 | Ogawa | G05B 19/416 318/560 |
| 9,122,267 | B2 * | 9/2015 | Morita | G06T 7/564 |
| 9,651,938 | B2 * | 5/2017 | Mitsuhashi | G05B 19/4061 |
| 9,902,070 | B2 | 2/2018 | Kunihiro | |
| 12,142,132 | B1 * | 11/2024 | Ibarra | G08B 29/04 |
| 2002/0066197 | A1 * | 6/2002 | Sano | B24B 49/00 33/549 |
| 2005/0010324 | A1 * | 1/2005 | Kaever | G05B 19/4061 700/178 |
| 2009/0265030 | A1 * | 10/2009 | Huang | G05B 19/4068 700/182 |
| 2012/0143369 | A1 * | 6/2012 | Prust | G05B 19/404 700/179 |
| 2019/0217434 | A1 * | 7/2019 | Adachi | B23Q 11/1076 |
| 2020/0285220 | A1 | 9/2020 | Saijo | |
| 2021/0291309 | A1 | 9/2021 | Kasahara et al. | |
| 2021/0311460 | A1 * | 10/2021 | Sagasaki | G05B 19/19 |
| 2021/0382455 | A1 * | 12/2021 | Sagasaki | G06N 20/00 |
| 2022/0250201 | A1 * | 8/2022 | Jacot | B23Q 17/2233 |
| 2022/0253036 | A1 * | 8/2022 | Ichimaru | G05B 19/409 |
| 2022/0314332 | A1 * | 10/2022 | Suzuki | B23B 5/14 |
| 2023/0182230 | A1 * | 6/2023 | Kitakaze | B23K 20/121 228/112.1 |
| 2024/0220534 | A1 * | 7/2024 | Meany | G06F 16/55 |

FOREIGN PATENT DOCUMENTS

| | | | | |
|---|---|---|---|---|
| CN | 111665788 | A | | 9/2020 |
| CN | 112045496 | A | | 12/2020 |
| CN | 112384328 | A | | 2/2021 |
| EP | 2846206 | A1 | | 3/2015 |
| EP | 3045266 | A1 | | 7/2016 |
| JP | 241856 | A | | 2/1990 |
| JP | 4256550 | A | | 9/1992 |
| JP | 10286746 | A | | 10/1998 |
| JP | 20049293 | A | | 1/2004 |
| JP | 2007-48210 | A | | 2/2007 |
| JP | 2008305237 | A | | 12/2008 |
| JP | 4456455 | B2 | | 4/2010 |
| JP | 4658734 | B2 | * | 3/2011 |
| JP | 2011-95877 | A | | 5/2011 |
| JP | 4727689 | B | | 7/2011 |
| JP | 2012168186 | A | | 9/2012 |
| JP | 2015-52872 | A | | 3/2015 |
| JP | 2016-132039 | A | | 7/2016 |
| KR | 10-1507683 | B1 | | 4/2015 |
| TW | 201634176 | A | | 10/2016 |

OTHER PUBLICATIONS

Taiwan Office Action with translation and search reporte issued in corresponding TW application No. 111124741 dated Oct. 21, 2025 (13 pages).

* cited by examiner

A1 A2 A3 A4 A5

| CHECK TARGET | TOOL NUMBER | TOOL TYPE | TOOL DIAMETER | PROJECTING LENGTH |
|---|---|---|---|---|
| YES | T1001 | ■20 | — | 18 |
| NO | T1002 | ■16 | — | 20 |
| NO | T1003 | ■12 | — | 24 |
| YES | T1004 | ■20 | — | 26 |
| NO | T2014 | ER16 | 8 | 12 |
| YES | T2026 | ER20 | 3 | 6 |

*FIG. 8A*

B1 B2 B3 B4

| TOOL NUMBER | TOOL CORRECTION VALUE | | |
|---|---|---|---|
| | X | Y | Z |
| T1001 | 0.000 | 0.000 | 0.000 |
| T1002 | 0.100 | 0.000 | 0.000 |
| T1003 | 0.000 | 0.100 | 0.000 |
| T1004 | 0.050 | 0.000 | 0.000 |
| T2014 | 0.000 | 0.020 | 0.100 |
| T2026 | 0.000 | 0.020 | 0.100 |

*FIG. 8B*

MACHINE TOOL SYSTEM

CROSS-REFERENCES

The present application is a continuation of PCT Application No. PCT/JP2022/026450, filed on Jul. 1, 2022, which claims priority of Japanese Patent Application No. 2021-116566 filed on Jul. 14, 2021. The contents of this application are incorporated herein by reference in their entirety.

BACKGROUND

(a) Field

The present invention relates to a machine tool system provided with a measuring apparatus.

(b) Description of the Related Art

Conventionally, a machine tool is provided with a control apparatus adapted to control a movement of a moving member such as a tool post and a rotation of a spindle and a rotary tool according to an NC (numerically control) program to machine a workpiece into a desired shape. The NC program is prepared by an operator of the machine tool or by a CAM (Computer Aided Manufacturing).

Whenever exchanging the workpiece or the machining shape for another, the operator necessarily performs a set-up operation, including a preparation of the NC program and an exchange of the tools and the chucks. The operator inputs information of a new tool in the control apparatus, including the type and the projecting length, or the rotation direction of a rotary tool. The operator then operates the machine tool at a low speed without inserting the workpiece to check whether any moving member interferes with an inner wall of a machining chamber (cutting chamber) or with any structure inside the machining chamber. The operator then performs a trial machining and inputs a correction value of a tool edge position in the control apparatus according to a measurement result of the machined workpiece. There is known another machine tool capable of performing an interference check by using an imaginary three-dimensional model (See Japanese Patent No. 4727689). The moving member is provided with a measuring apparatus that measures a distance to the workpiece as the moving member moves. The machine tool thereby recognizes the shape of the workpiece and generates an imaginary three-dimensional model according to the recognized shape to check whether the moving member interferes with the workpiece.

SUMMARY OF THE INVENTION

In the conventional machine tool, however, the operator possibly selects a wrong tool in the interference check or there possibly happens a difference of the attaching positions between the tool in the check and the tool actually attached to the moving member. After the interference check using the three-dimensional model is done, the operator operates the machine tool at low speed according to the NC program to verify the check result. It is very inconvenient for the operator.

The present invention provides a highly convenient machine tool system.

A machine tool system of the invention includes:

a tool post to which a tool for machining a workpiece is attached;

a numerical control unit adapted to control a movement of the tool post according to a numerical control program; and a measuring apparatus adapted to measure a position and a shape of the tool attached to the tool post.

The measuring apparatus measures the position and the shape of the tool attached to the tool post. The machine tool system can utilize the tool position information and the tool shape information of the tool actually attached to the tool post. Applying such information in the interference check process using the imaginary three-dimensional model generates no difference of the position and the shape between the tool in the check and the tool actually attached to the tool post. That eliminates the need of verifying the check result on the actual machine, thus improving the convenience. The measurement of the tool position and the tool shape allows an acquisition of a tool edge position information, from which a correction value information thereof can be generated and automatically stored in the machine tool. That eliminates the need of manually storing the correction value, thus preventing a human error and improving the convenience. The machine tool system may include the machine tool alone and the machine tool system including a computer connected to the machine tool.

In the machine tool system of the invention, the measuring apparatus further measures a shape of a tool holder for attaching the tool to the tool post, the machine tool system further comprising:

a tool holder information storing unit adapted to store a shape information of the tool holder in association with a property information of the tool holder for each of a plurality of the tool holders attachable to the tool post, and a holder information acquiring unit adapted to identify the shape information of the tool holder corresponding to the shape measured by the measuring apparatus among the shape information of the plurality of the tool holders stored in the tool holder information storing unit and then acquire the property information of the tool holder stored in association with the identified shape information of the tool holder.

Using the property information of the tool holder actually attached to the tool post enables various processings to be done including a calculation of the projecting length of the tool.

The machine tool system of the invention further includes:

an attaching tool information storing unit adapted to store an attaching tool information according to the position and the shape of the tool measured by the measuring apparatus; and an attaching tool check unit adapted to compare the attaching tool information stored in the attaching tool information storing unit with an attaching tool information acquired from the position and the shape of the tool newly measured by the measuring apparatus to determine whether the tool that is desired is attached to the tool post.

The operator can readily check whether the tool type and the tool attaching position is correct when he is trying the same machining as previously done. Especially, once a skilled operator has stored the tool position and the tool shape in the attaching tool information storing unit, another unskilled operator can conveniently verify that the tool is correct and that the tool is attached in the same manner as the skilled operator, thus improving the convenience.

In the machine tool system of the invention, the measuring apparatus further measures a position and a shape of a coolant nozzle whose position and a coolant discharging angle is adjustable, the machine tool system further comprising:

an interference check unit adapted to generate an imaginary three-dimensional model by using the position and the shape of the coolant nozzle measured by the measuring apparatus and the position and the shape of the tool measured by the measuring apparatus to perform an interference check between the tool and the coolant nozzle by moving the tool post of the imaginary three-dimensional model according to the numerical control program.

The interference check can determine whether any interference affects the coolant discharging angle and the coolant nozzle position.

The machine tool system of the invention further includes a first spindle gripping the workpiece and rotatable around a spindle axis; and a headstock provided with a second spindle facing the first spindle, the headstock being movable in a direction perpendicular to the spindle axis, wherein the measuring apparatus is mounted on the headstock to measure a distance to an object while moving in the direction perpendicular to the spindle axis as the headstock moves.

The measuring apparatus can measure the position and the shape of the tool attached to the tool post and a major structure of the machine tool system when it is mounted on the headstock provided with the second spindle. The measuring apparatus can measure a wide range while the headstock moves in the direction perpendicular to the spindle axis.

In the machine tool system of the invention, the measuring apparatus is removably mounted on the headstock, and when the measuring apparatus is mounted on the headstock, it sends a signal representing that the measuring apparatus is mounted on the headstock.

Removal of the measuring apparatus from the headstock prevents coolant and chips falling on the measuring apparatus. When the measuring apparatus is mounted on the headstock, it is possible to determine that the measuring apparatus is mounted on the headstock upon receipt of the signal.

The measuring apparatus may be removably mounted on the tool post. The measuring apparatus may send a signal representing that it is mounted on the tool post.

The invention provides a highly convenient machine tool system.

BRIEF DESCRIPTION OF THE DRAWINGS

FIG. 8A shows a selection menu of a check target along with attaching tool information acquired in the set-up check process.

FIG. 8B is a list of a tool correction value acquired in a correction input process.

DETAILED DESCRIPTION

Figure 1:
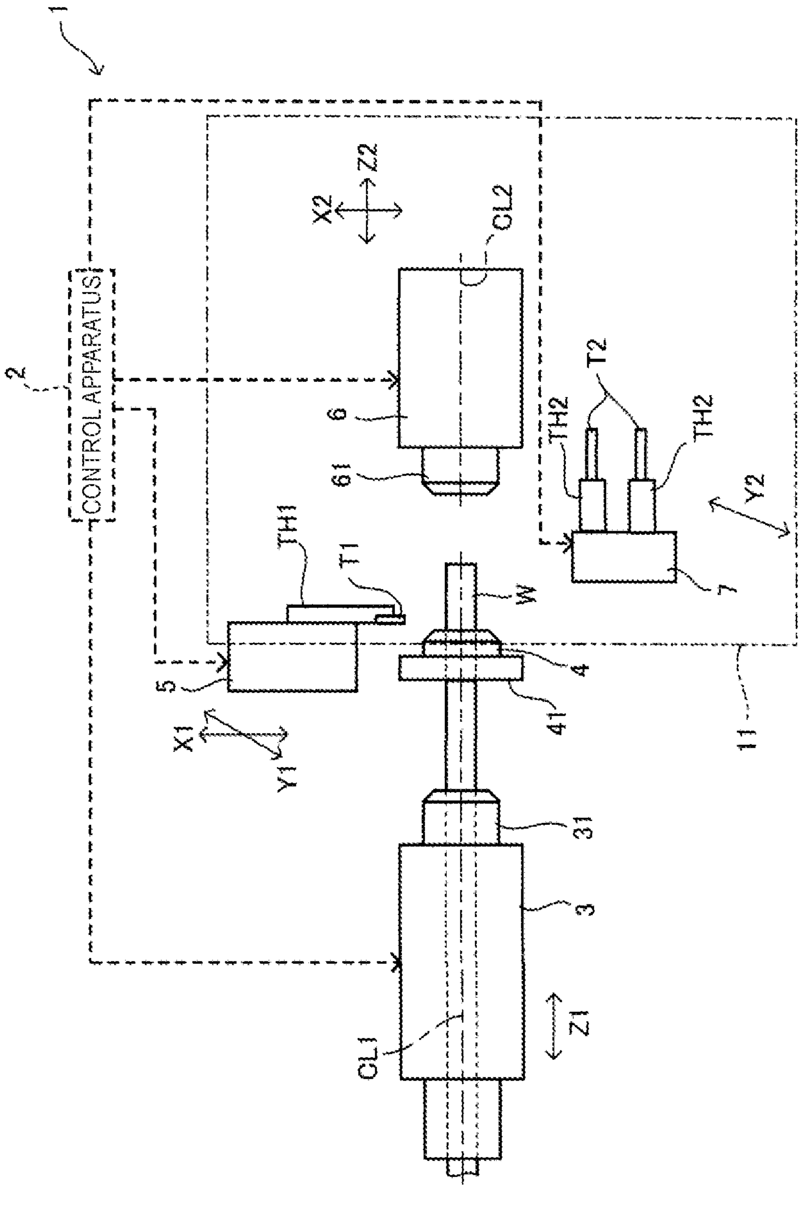
FIG. 1 is a top view of an internal configuration of an NC lathe of the invention.

Hereinafter, an embodiment of the present invention will be described referring to the drawings. The invention may be embodied in an NC (Numerical Control) lathe.

FIG. 1 is a top view of an internal configuration of the NC lathe 1 of the embodiment. FIG. 1 also shows a control apparatus 2 provided in the NC lathe 1. A cutting chamber 11 is enclosed by a square of a fine two-dot chain line.

Figure 2:
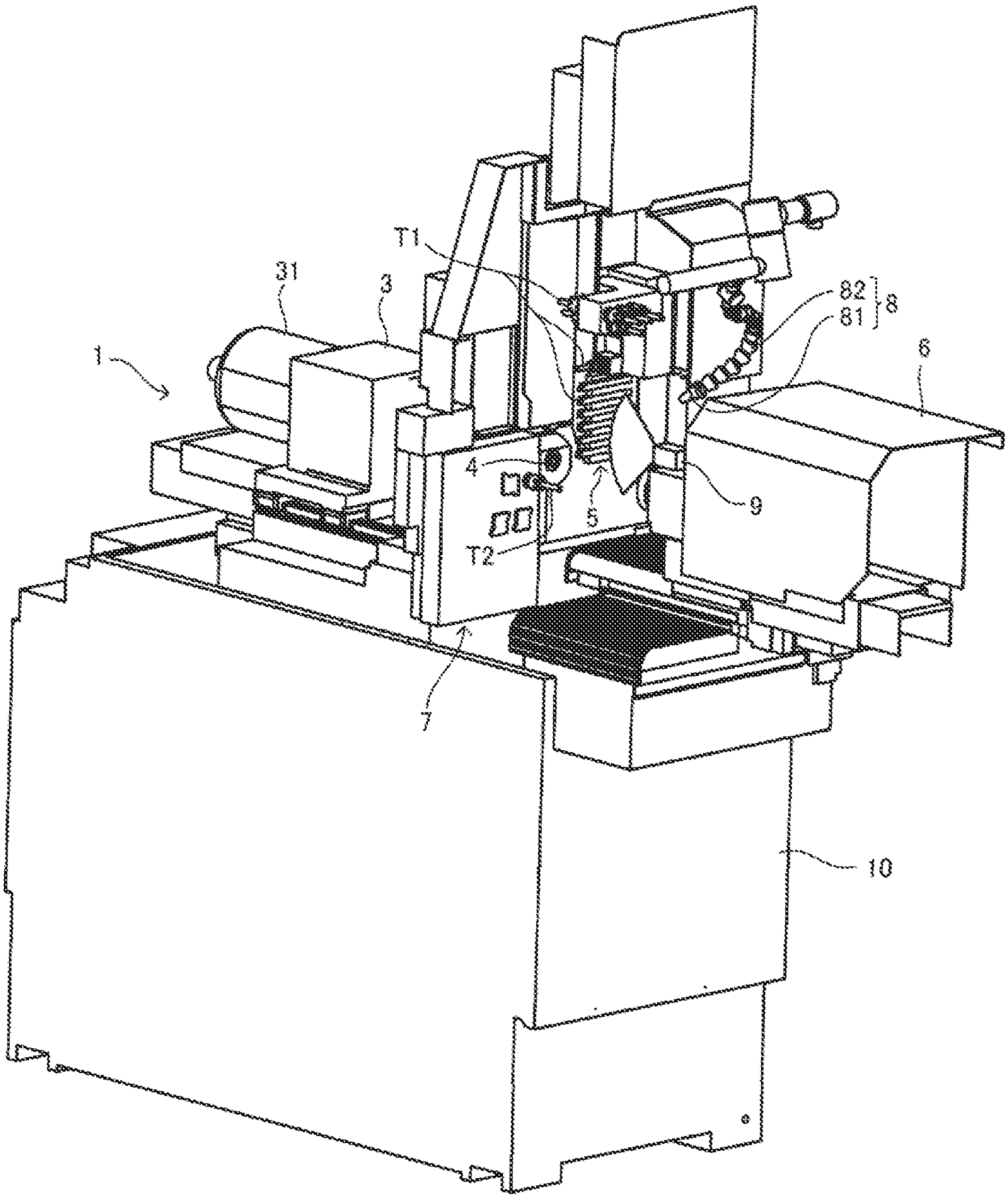
FIG. 2 is a perspective view of the internal configuration of the NC lathe.

As shown in FIG. 1, the NC lathe 1 internally includes a first headstock 3, a guide bush 4, a first tool post 5, a second headstock 6, and a second tool post 7. The NC lathe 1 corresponds to the machine tool and also to the machine tool system. The first headstock 3, the guide bush 4, the first tool post 5, the second headstock 6, and the second tool post 7 are mounted on a leg 10 as a base (FIG. 2). The first headstock 3, the first tool post 5, the second headstock 6, and the second tool post 7 are controlled by the control apparatus 2. The control apparatus 2 may be a computer that numerically controls the first headstock 3, the first tool post 5, the second headstock 6, and the second tool post 7 mainly according to an NC program. The control apparatus 2 controls a rotation of a first spindle 31 and a second spindle 61. The control apparatus 2 may control a rotation of a rotary tool when it is attached to the first tool post 5 or the second tool post 7.

The first headstock 3 having the first spindle 31 is movable in a Z1-axis direction. The Z1-axis direction is a horizontal direction, which is a right-left direction in FIG. 1. The Z1-axis direction corresponds to an axial direction of the first spindle 31. The first spindle 31 grips a workpiece W, which is a long bar inserted inside the first spindle 31. The first spindle 31 gripping the workpiece W is rotatable around a first spindle axis CL1. The direction of the first spindle axis CL1 matches the Z1-axis direction.

The guide bush 4 is fixed on the leg 10 (FIG. 2) through a guide bush supporting bed 41. An end surface of the guide bush 4 opposite another end surface facing the first spindle 31 is exposed inside the cutting chamber 11. The guide bush 4 slidably supports a leading end of the workpiece W inserted through the first spindle 31 in the Z1-axis direction. The guide bush 4 that supports the workpiece W is rotatable around the first spindle axis CL1 in synchronization with the first spindle 31. The first spindle axis CL1 is a rotation axis of the workpiece W supported by the guide bush 4. The guide bush 4 suppresses a deflection of the workpiece W, thus improving machining accuracy especially when the workpiece W is long.

The first tool post 5 is movable in a horizontal X1-axis direction and a vertical Y1-axis direction. The X1-axis direction is perpendicular to the Z1-axis direction. The first tool post 5 is an example of the tool post. In FIG. 1, the X1-axis direction is the up-down direction and the Y1-axis direction is perpendicular to a paper plane. The first tool post 5 has a first tool holder TH1 to which a first tool T1 is attached. The first tool T1 is attached to the first tool post 5 through the first tool holder TH1. The first tool T1 and the first tool holder TH1 are collectively called a front tool unit. The front tool unit may be a throw-away tool, in which a tip or an edge of the tool corresponds to the first tool T1 while a shank to which the tip is attached corresponds to the first tool holder TH1. The front tool unit may be a brazed tool or a solid tool, which is an integrated tool unit that the first tool T1 and the first tool holder TH1 are substantially integrated. The front tool unit is disposed in the cutting chamber 11. The first tool post 5 has a plurality of front tool units arranged comb-like in the Y1-axis direction including a turning front tool unit and a cut-off front tool unit. The movement of the first tool unit 5 in the Y1-axis direction allows a selection of any one of the plurality of front tool units. The movement of the first tool unit 5 in the X1-axis direction allows the first tool T1 of the selected front tool unit to cut into the workpiece W gripped by the first spindle 31. The first tool post 5 may have a rotary tool projecting in the X1-axis direction or in the Z1-axis direction. The rotary tool may be an endmill or a drill.

The second headstock 6 is disposed in the cutting chamber 11. The second headstock 6 having the second spindle 61 is movable in an X2-axis and a Z2-axis directions. The X2-axis direction is the same direction as the X1-axis direction. The Z2-axis direction is the same direction as the Z1-axis direction. The X2-axis direction corresponds to the perpendicular direction. The Z2-axis direction corresponds to an axial direction of the second spindle 61. The second headstock 6 may be movable in a Y2-axis direction perpendicular to the X2-axis direction and the Z2-axis direction. FIG. 1 shows that the second spindle 61 faces the first spindle 31 over the guide bush 4. A second spindle axis CL2, which is a rotation axis of the second spindle 61 is on the same line as the first spindle axis CL1. The direction of the second spindle axis CL2 matches the Z2-axis direction. The second spindle 61 receives the end portion of the workpiece W cut off by the first tool T1 upon completion of machining by using the first spindle 31. The end portion of the workpiece W delivered to the second spindle 61 is called a cut-off workpiece. The second spindle 61 releasably grips the cut-off workpiece delivered from the first spindle 31.

The second tool post 7 is disposed in the cutting chamber 11. The second tool post 7 is movable in a Y2-axis direction. The Y2-axis direction is the same direction as the Y1-axis direction. The second tool post 7 is an example of the tool post. The second tool post 7 may have a plurality of second tool holders TH2, each of which holds a second tool T2 such as a drill and an endmill for use to machine the cut-off workpiece. The second tool T2 is attached to the second tool post 7 through the second tool holder TH2. The second tool T2 and the second tool holder TH2 are collectively called a back tool unit. The first tool T1 and the second tool T2 may be respectively called a tool. The first tool holder TH1 and the second tool holder TH2 may be respectively called a tool holder. The back tool unit is arranged in the Y2-axis direction as well as in the X2-axis direction though not illustrated. The movement of the second headstock 6 in the X2-axis direction and the movement of the second tool post 7 in the Y2-axis direction allow a selection of any one of the plurality of the back tool units. The movement of the second headstock 6 in the Z2-axis direction allows the tool to cut into a cut-end of the cut-off workpiece gripped by the second spindle 61.

FIG. 2 is a perspective view of the internal configuration of the NC lathe shown in FIG. 1.

A coolant discharging unit 8 is disposed in the cutting chamber 11. The coolant discharging unit 8 discharges coolant toward an object to be cut. The coolant discharging unit 8 includes a coolant nozzle 81 and a coolant hose 82. The coolant nozzle 81 is attached to the end of the coolant hose 82. The coolant nozzle 81 is angular-adjustable to discharge coolant from the end thereof. The coolant hose 82 forms a path through which coolant is supplied to the coolant nozzle 81. The coolant hose 82 is flexibly bent to retain any flexible shape. The angular-adjustable nozzle 81 is attached to the flexibly retainable hose 82. That allows a free arrangement of the coolant nozzle 81 and a free adjustment of the discharging angle.

A scanner 9 is removably mounted on the second headstock 6 to measure a position and a shape of a structure inside the cutting chamber 11 (FIG. 1). The scanner 9 corresponds to the measuring apparatus. The scanner 9 may be a two-dimensional scanner consisting of an infrared laser generating device and a motor-driven polygon mirror. The scanner 9 spreads an infrared laser over the Y1-axis direction by the polygon mirror and linearly radiates the infrared laser to the object on the first spindle 31 side to measure the distance to the object according to a degree of reflection of the infrared laser. The infrared laser generating device and the mirror driving motor are controlled by the control apparatus 2 to which the scanner 9 is connected. FIG. 2 shows a range of the infrared radiation by a small void fan shape. The actual range is wider in the up-down direction and longer. The infrared radiation from the scanner 9 mounted on the second headstock 6 moving in the X2-axis direction allows an acquisition of information regarding the position and the shape of the object with respect to each of the X, Y, and Z directions.

Figure 3:
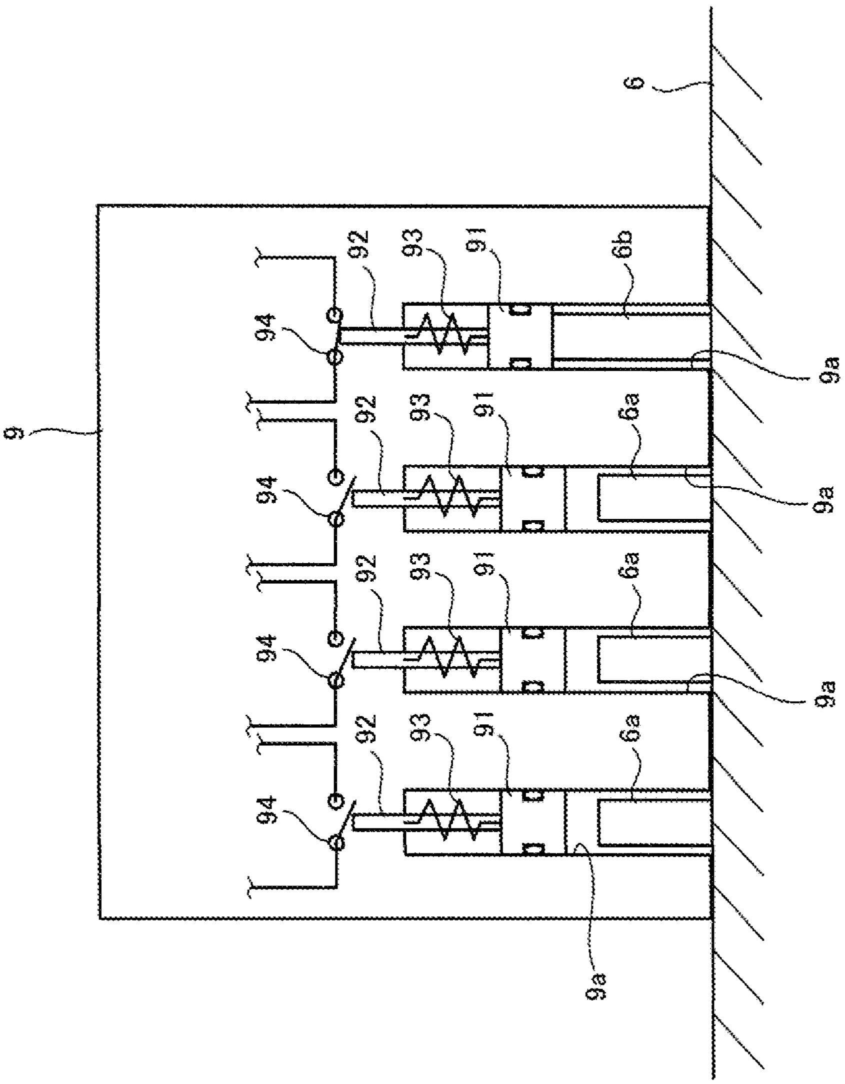
FIG. 3 is a sectional view showing a connection between a scanner and a headstock shown in FIG. 2.

FIG. 3 is a sectional view showing a connection between the scanner and the headstock shown in FIG. 2.

The second headstock 6 has three short pins 6*a* and a single long pin 6*b* to mount the scanner 9 thereon. The short pins 6*a* and the long pin 6*b* are columnar pins of the same diameter. The scanner 9 has four holes 9*a* in positions corresponding to the short pins 6*a* and the long pin 6*b* of the second headstock 6. FIG. 3 shows bigger gaps between the pins 6*a*, 6*b* and the holes 9*a*. Actually, one of the combinations of the pins 6*a*, 6*b* and the holes 9*a* has little gap therebetween. One of the holes 9*a* is a long hole whose longitudinal side extending in the right-left direction in FIG. 3. The length of the longitudinal side is a little longer than the diameter of the short pin 6*a* while the length of the short side is almost the same as the diameter of the short pin 6*a* or a little longer than that. The scanner 9 is definitely positioned with respect to the second headstock 6 by the engagement of the holes 9*a* with the short pins 6*a* and the long pin 6*b*, respectively.

A slider 91 and a spring 93 are disposed in each of the holes 9*a*. The slider 91 is kept in a position by the spring 93. On the top surface of the slider 91, a push pin 92 projects upward. A switch 94 is arranged in a position above the push pin 92. When the scanner 9 is mounted on the second headstock 6, the slider 91 moves upward by the long pin 6*b* and the right one (FIG. 3) of the four switches 94 turns on. The scanner 9 sends a mounting position signal representing that the scanner 9 is mounted on the second headstock 6 according to the on or off states of the four switches 94. The scanner 9 may be removably secured to the second headstock 6 by not-shown screws or any other fasteners.

The first tool post 5 may have similar pins and screw holes to mount the scanner 9 thereon. The second tool post 7 may have similar pins and screw holes to mount the scanner 9 thereon. A robot arm may be disposed in the cutting chamber 11 and the robot arm may have similar pins and screw holes to mount the scanner 9 thereon. When the scanner 9 is mounted on any of the moving members such as the first tool post 5 and the second headstock 6, a variation in the position and the combination of the short pins 6*a* and the long pin 6*b* allows an automatic determination of the moving member that the scanner 9 is mounted. The scanner 9 may send different mounting position signals for the different moving members according to the on or off states of the four switches 94. Upon receipt of the signal, a scanner mounting position determining unit 25 described below can determine where the scanner 9 is mounted.

Figure 4:
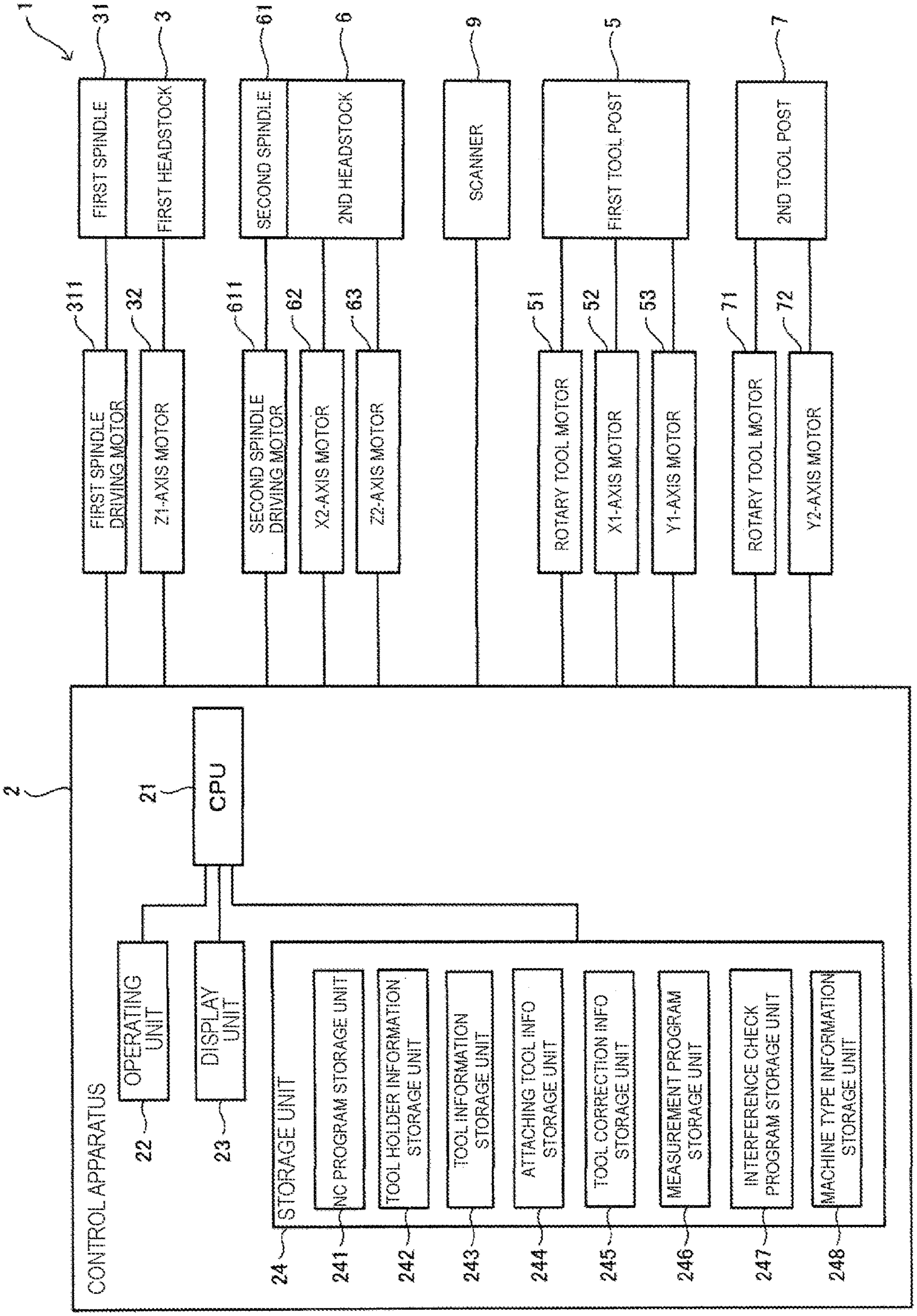
FIG. 4 is a block diagram of a hardware configuration of the NC lathe.

FIG. 4 is a block diagram of a hardware configuration of the NC lathe shown in FIG. 1. Any element of low relevancy to the invention is not shown.

The first spindle 31 is provided with a first spindle driving motor 311 such as a built-in motor. The first spindle driving motor 311 rotates under control of the control apparatus 2 to rotate the first spindle 31 around the first spindle axis CL1 (FIG. 1). The workpiece W gripped by the first spindle 31 thereby rotates around the first spindle axis CL1. The first headstock 3 is provided with a Z1 linear mechanism driven by a Z1-axis motor 32. The Z1-axis motor 32 rotates under control of the control apparatus 2 to move the first headstock 3 in the Z1-axis direction.

The second headstock 6 is provided with a second spindle driving motor 611 such as a built-in motor. The second spindle driving motor 611 rotates under control of the control apparatus 2 to rotate the second spindle 61 around the second spindle axis CL2 (FIG. 1). The cut-off workpiece gripped by the second spindle 61 thereby rotates around the second spindle axis CL2. The second headstock 6 is provided with an X2 linear mechanism driven by an X2-axis motor 62 and a Z2 linear mechanism driven by a Z2-axis motor 63. The X2-axis motor 62 and the Z2-axis motor 63 may be a servo motor. The X2-axis motor 62 rotates under control of the control apparatus 2 to move the second headstock 6 in the X2-axis direction. The Z2-axis motor 63 rotates under control of the control apparatus 2 to move the second headstock 6 in the Z2-axis direction.

The first tool post 5 is provided with a first rotary tool driving motor 51. The first rotary tool driving motor 51 rotates in a specified direction under control of the control apparatus 2 to rotate the rotary tool attached to the first tool post 5 to rotate in a rotation direction according to the rotation direction of the first rotary tool driving motor 51. The first tool post 5 is provided with an X1 linear mechanism driven by an X1-axis motor 52 and a Y1 linear mechanism driven by a Y1-axis motor 53. The X1-axis motor 52 and the Y1-axis motor 53 may be a servo motor. The X1-axis motor 52 rotates under control of the control apparatus 2 to move the first tool post 5 in the X1-axis direction. The Y1-axis motor 53 rotates under control of the control apparatus 2 to move the first tool post 5 in the Y1-axis direction.

The second tool post 7 is provided with a second rotary tool driving motor 71. The second rotary tool driving motor 71 rotates in a specified direction under control of the control apparatus 2 to rotate the rotary tool attached to the second tool post 7 to rotate in a rotation direction according to the rotation direction of the second rotary tool driving motor 71. The second tool post 7 is provided with a Y2 linear mechanism driven by a Y2-axis motor 72. The Y2-axis motor 72 may be a servo motor. The Y2-axis motor 72 rotates under control of the control apparatus 2 to move the second tool post 7 in the Y2-axis direction.

The control apparatus 2 includes a CPU (Central Processing Unit) 21, an operating unit 22, a display unit 23, and a storage unit 24. The scanner 9 is connected to the control apparatus 2. The infrared laser generating device and the scanner driving motor is thereby controlled by the control apparatus 2. The CPU 21 executes a processing and a calculation according to a program stored in the storage unit 24. The operating unit 22 includes a plurality of buttons and keys accepting an input operation by the operator of the NC lathe 1. The operating unit 22 may be a touch panel integrated with the display unit 23. The operator can store the NC program in the storage unit 24 by using the operating unit 22 and an external computer. The operator may modify the NC program and store the modified program in the storage unit 24 through the operating unit 22. The display unit 23 displays the NC program stored in the storage unit 24 and various settings and information of the NC lathe 1.

The storage unit 24 includes an NC program storage unit 241, a tool holder information storage unit 242, a tool information storage unit 243, an attaching tool information storage unit 244, a tool correction information storage unit 245, a measuring program storage unit 246, an interference check program storage unit 247, and a machine type information storage unit 248. The NC program storage unit 241 stores the NC program. The tool holder information storage unit 242 stores many sets of a tool holder type information and a tool holder shape information in association with a tool holder property information for each and every tool holder applicable in the NC lathe 1 and attachable to the first tool post 5 or the second tool post 7. The tool holder property information includes a rotary tool holder information representing the tool holder is a rotary tool holder, a projecting height of the rotary tool holder from the end surface of the tool post, and a rotation direction information of the rotary tool holder whose rotation direction is restricted. The tool information storage unit 243 stores many sets of a tool type information in association with a tool shape information for each and every tool applicable in the NC lathe 1 and attachable to the first tool post 5 or the second tool post 7.

The attaching tool information storage unit 244 stores a plurality of attaching tool information acquired based on the position and the shape of the tool measured in a set-up check process. The attaching tool information may include the tool information denoted by A2 to A5 in FIG. 8A described below, which is the information of the tool actually attached to the first tool post 5 or the second tool post 7 whose position and shape was measured in any past set-up check process. The operator can store the information in the attaching tool information storage unit 244 in the set-up check process. The attaching tool information may include any information directly input by the operator through the operating unit 22. The attaching tool information storage unit 244 may further store a tool holder information of a tool holder to which the tool is attached in association with the tool information.

The tool correction information storage unit 245 stores a tool correction value information representing an offset amount from a tool edge reference position for every tool attached to the first tool post 5 and the second tool post 7. The tool correction value information is used to adjust a relative position between the tool and the workpiece W in machining the workpiece W according to the NC program. The tool correction value information may include a plurality of information such as a shape offset, a wear offset, and a thermal correction offset for every tool. In this embodiment, however, a single tool correction value information is stored for every tool for the purpose of explanation. The tool correction value information may be automatically stored in the tool correction information storage unit 245 upon execution of a correction input mode described below. The operator can input the information through the operating unit 22.

The measuring program storage unit 246 stores a program for measuring the structure inside the cutting chamber 11. The interference check program storage unit 247 stores a program of an interference check process (Step S18 in FIG. 6, FIG. 10) to determine whether the structures interfere each other or the structure interferes with the workpiece W. The machine type information storage unit 248 stores an information of a machine type of the NC lathe 1, an information regarding an object to be measured, and an information of a moving member the scanner 9 can be mounted.

Figure 5:
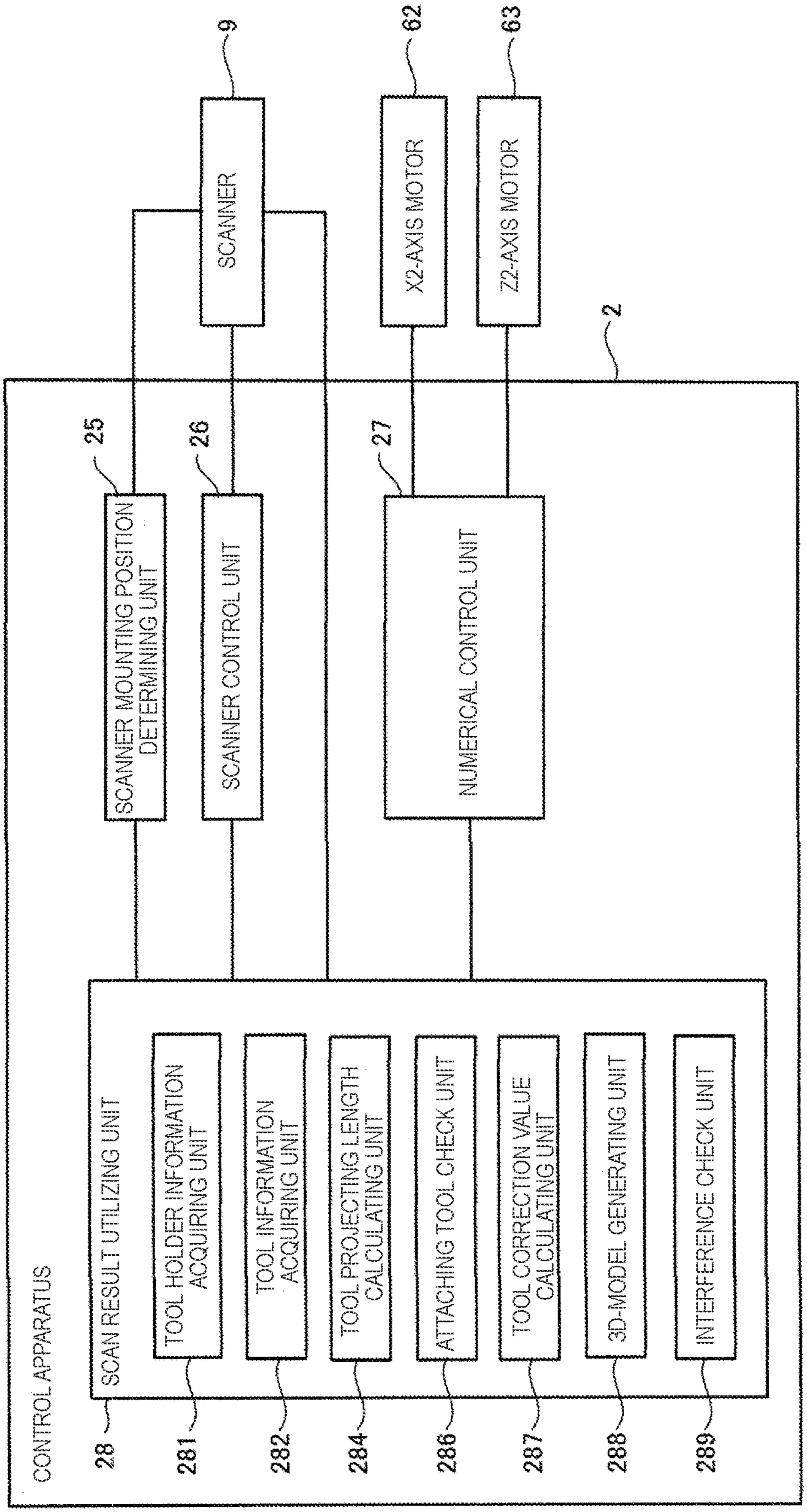
FIG. 5 is a functional block diagram of a functional configuration of the NC lathe.

FIG. 5 is a functional block diagram showing a functional configuration of the NC lathe shown in FIG. 1. FIG. 5 shows the configuration of high relevancy to the invention. The other functional configuration of the control apparatus 2 is not shown.

The control apparatus 2 includes the scanner mounting position determining unit 25, a scanner control unit 26, a numerical control unit 27, and a scan result utilizing unit 28. These units 25, 26, 27, and 28 are implemented mainly by the CPU 21 and the storage unit 24 shown in FIG. 4. The scanner mounting position determining unit 25 receives a mounting position signal from the scanner 9. The signal may depend on the moving member the scanner 9 is mounted as described above referring to FIG. 3. The scanner mounting position determining unit 25 can determine on which moving member the scanner 9 is mounted.

The scanner control unit 26 controls the operation of the scanner 9. Specifically, the scanner control unit 26 controls infrared radiation from the infrared laser generating device and the number of rotations of the polygon mirror. The numerical control unit 27 controls the movement of the moving member such as the first tool post 5, the second headstock 6 (FIG. 1), and the second tool post 7 and also controls the rotation of the rotating member such as the first spindle 31 (FIG. 1). The scan result utilizing unit 28 receives a scanner control information from the scanner control unit 26 and a motor control information of the X2-axis motor 62 and the Z2-axis motor 63 from the numerical control unit 27. The scan result utilizing unit 28 can thereby recognize the target of infrared radiation and the location of the scanner 9 inside the cutting chamber 11.

The scan result utilizing unit 28 includes a tool holder information acquiring unit 281, a tool information acquiring unit 282, a tool projecting length calculating unit 284, an attaching tool check unit 286, a tool correction value calculating unit 287, a 3D-model generating unit 288, and an interference check unit 289. The tool holder information acquiring unit 281 compares the tool holder shape information acquired from the measurement by the scanner 9 and the tool holder shape information acquired from the tool holder information storage unit 242 (FIG. 4) to identify what tool holder is mounted. The tool holder information acquiring unit 281 then acquires the tool holder type, the tool holder shape, and the tool holder property of the identified tool holder from the tool holder information storage unit 242. The tool information acquiring unit 282 compares the tool shape information acquired from the measurement by the scanner 9 and the tool shape information acquired from the tool information storage unit 243 (FIG. 4) to identify what tool is mounted. The tool information acquiring unit 282 then acquires the tool type and the tool shape of the identified tool from the tool information storage unit 243. The tool projecting length calculating unit 284 calculates the projecting length of the tool. When the tool is a turning tool, the tool projecting length calculating unit 284 calculates a distance from the tool attaching surface of the first tool post 5 or second tool post 7 to the edge of the tool. When the tool is a rotary tool, the tool projecting length calculating unit 284 calculates the projecting length of the tool from the tool holder and the tool diameter of the rotary tool totally from the projecting height of the tool holder from the tool attaching surface, the tool shape information, and the measurement result by the scanner 9. The tool projecting length calculating unit 284 may use only the measurement result when the measurement is highly accurate with regard to the position and the shape of the tool and the tool holder.

The attaching tool check unit 286 acquires a specified attaching tool information from the attaching tool information storage unit 244 (FIG. 4) among the plurality of attaching tool information. The attaching tool check unit 286 then compares the past attaching tool information stored in the attaching tool information storage unit 244 with the tool type information acquired by the tool information storage unit 282 and the tool projecting length calculated by the tool projecting length calculating unit 286. The attaching tool check unit 286 thereby check whether the specified past attaching tool information matches the current attaching tool information.

The tool correction value calculating unit 287 calculates an edge position of the tool according to the tool position information and the tool shape information acquired from the measurement by the scanner 9 and the tool type information identified by the tool information acquiring unit 282. The tool correction value calculating unit 287 then calculates a tool correction value according to the calculated edge position of the tool and stores the calculated tool correction value in the tool correction information storage unit 245 (FIG. 4).

The 3D-model generating unit 288 generates an imaginary three-dimensional model of the structure inside the cutting chamber 11 in an imaginary space according to the measurement by the scanner 9. The interference check unit 289 performs an interference check of the structure by operating the imaginary three-dimensional model according to the NC program.

Figure 6:
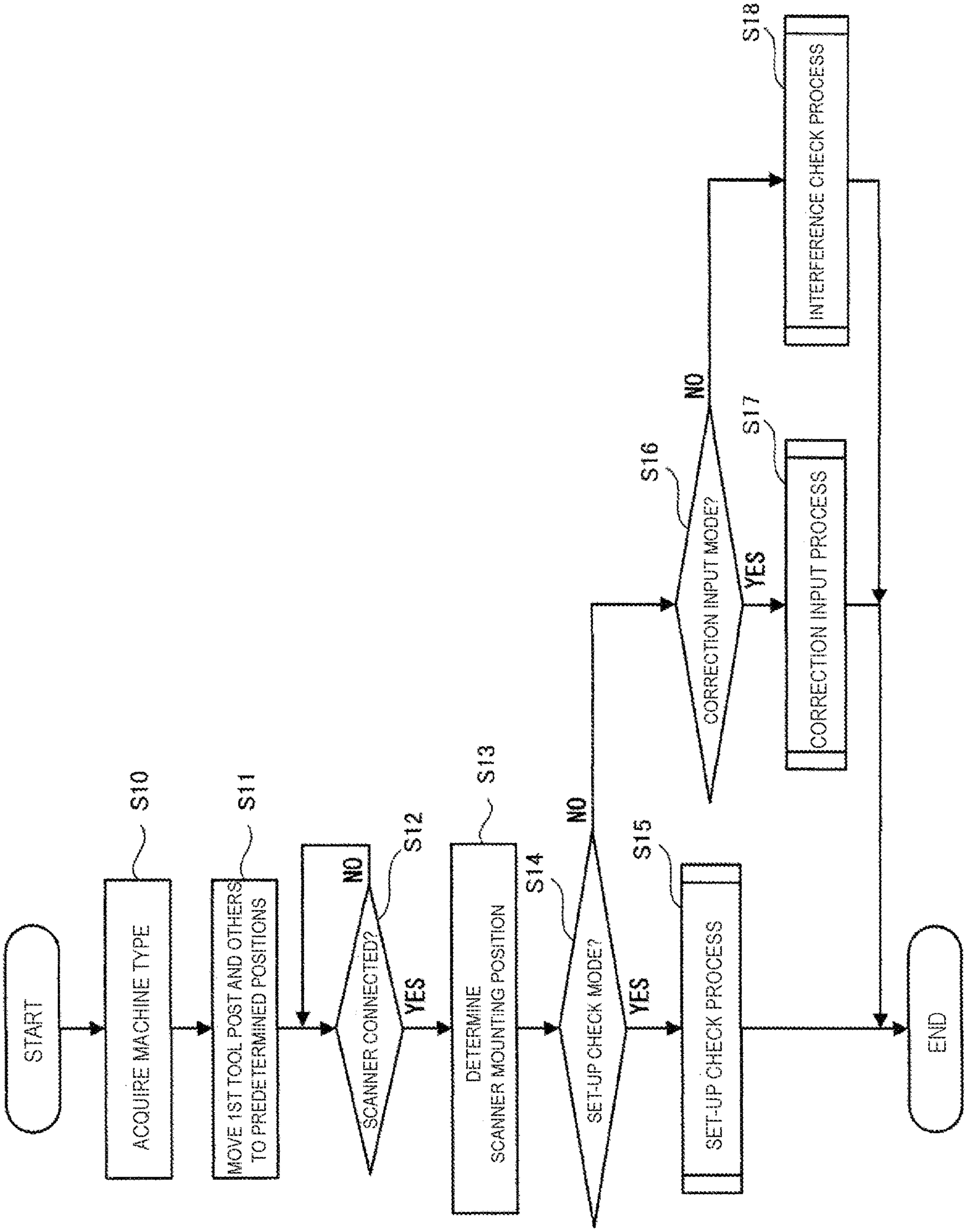
FIG. 6 is a flowchart of a measurement of a structure inside a cutting chamber of the NC lathe.

FIG. 6 is a flowchart of the measurement of the structure inside the cutting chamber of the NC lathe shown in FIG. 1.

The measurement processes are being described sequentially referring to FIG. 6 to FIG. 11 and basically to FIG. 1 to FIG. 5. The description relates to an example that the scanner 9 is mounted on the second headstock 6. The measurement process starts upon receipt of a starting operation by the operator in a measurement mode specified through the operating unit 22. The control apparatus 2 executes the process including a calculation while controlling the operation of the moving members and the scanner according to a measurement program stored in the measurement program storage unit 246. As shown in FIG. 6, the control apparatus 2 first acquires the machine type of the NC lathe 1, the object to be measured, and the moving members that the scanner 9 can be mounted from the machine type information storage unit 248 (Step S10). Then the numerical control unit 27 controls the movement of the first headstock 3, the first tool post 5, the second headstock 6, and the second tool post 7 respectively to predetermined positions suitable for the measurement (Step S11). The control apparatus 2 determines whether the scanner 9 is connected to the control apparatus 2 by exchanging scanner mounting position signals with the scanner 9 (Step S12). In the case that the scanner 9 is not connected to the control apparatus 2 (NO in Step S12), the control apparatus 2 stands by until the scanner 9 is connected. In the case that the scanner 9 is connected to the control apparatus 2 (YES in Step S12), the control apparatus 2 determines on which moving member the scanner 9 is mounted according to the scanner mounting position signal sent from the scanner 9 (Step S13). In this embodiment, the control apparatus 2 determines that the scanner 9 is mounted on the second headstock 6.

The control apparatus 2 determines whether the measurement mode specified by the operator is the set-up check mode (Step S14). In the case that the measurement mode is the set-up check mode (YES in Step S14), the control apparatus 2 performs the set-up check process in a manner described below (Step S15). In the case that the measurement mode is not the set-up check mode (NO in Step S14), the control apparatus 2 determines whether the measurement mode is a correction input mode (Step S16). In the case that the measurement mode is the correction input mode (YES in Step S16), the control apparatus 2 performs the correction input process in a manner described below (Step S17). In the case that the measurement mode is not the correction input mode (NO in Step S16), the control apparatus 2 performs the interference check process in a manner described below (Step S18). Upon completion of each process, the control apparatus 2 terminates the measurement process. The operator removes the scanner 9 from the second headstock 6 and takes it outside the cutting chamber 11 before starting machining of the workpiece W according to the NC program.

Figure 7:
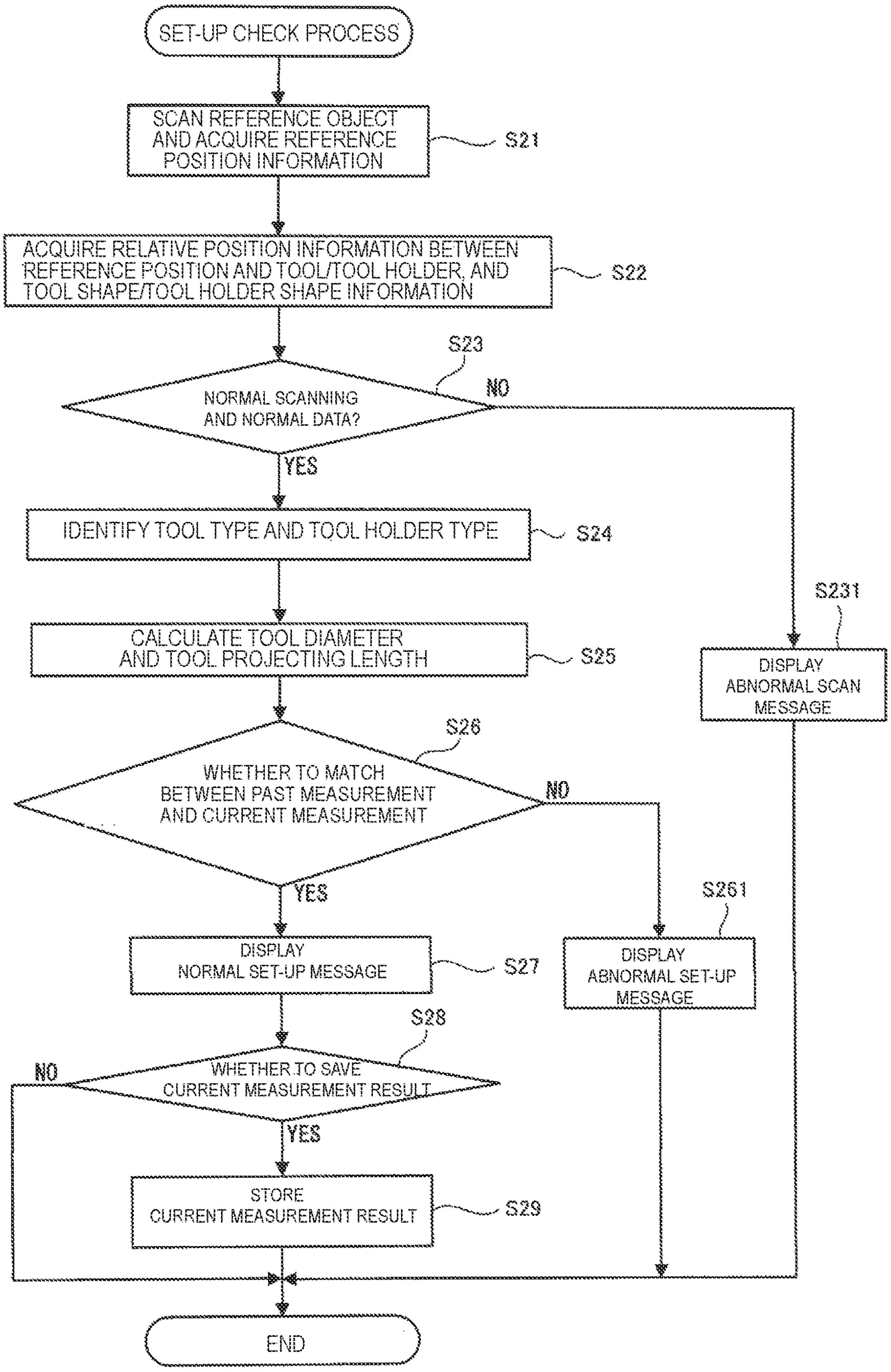
FIG. 7 is a flowchart of a set-up check process shown in FIG. 6.

FIG. 7 is a flowchart of the set-up check process shown in FIG. 6. FIG. 8A shows a selection menu of a check target along with the attaching tool information acquired in the set-up check process. The check target is the first tool T1 attached to the first tool post 5. The check target may be the second tool T2 or may be both.

When the set-up check mode is selected as the measurement mode, the control apparatus 2 displays the dates of all the previous set-up check processes stored in the attaching tool information storage unit 244 on the display unit 23. Any other information such as a reference number, a title and a comment stored in association with the previous set-up check processes may be also displayed. The operator may select a desired one of the displayed previous attaching tool information through the operating unit 22 for comparison use in the current set-up check process. The operator may input otherwise through the operating unit 22 when he is interested in nothing of the displayed previous attaching tool information. In the case the operator selects a desired one, the selected information is displayed on the display unit 23 as shown in FIG. 8A. The columns A2 to A5 show the attaching tool information according to the past measurement. The column A1 shows a YES or NO selection menu, in which YES represents that the operator selects it as the check target in the current set-up check process. The column A2 shows the tool number representing on what position on the first tool post 5 or the second tool post 7 the tool is attached. The operator may switch YES or NO in the column A1 through the operating unit 22 to select the check target in the current set-up check process. The display unit 23 may actually show so many tools as corresponding to the tool attaching positions of the first tool post 5 and the second tool post 7. FIG. 8A simply shows part of them.

As shown in FIG. 7, the numerical control unit 27 controls the movement of the second headstock 6 to bring the scanner 9 in front of a reference object. The scanner 9 measures the position and the shape of the object while the second headstock 6 moves. The control apparatus 2 acquires a reference position information of a particular reference position of the reference object (Step S21). The reference object and the reference position are specified in the measurement program. In this embodiment, the plurality of first tools T1 attached to the first tool post 5 is selected as the check target while the first tool post 5 is specified as the reference object and a particular point of the first tool post 5 is specified as the reference position. When the second tool T2 attached to the second tool post 7 is selected as the check target, the set-up check process for the second tool T2 is performed, too. Then a particular point of the second tool post 7 is specified as the reference position. Upon acquisition of the reference position information, the numerical control unit 27 controls the movement of the second headstock 6 at least in the X2-axis direction while operating the scanner 9. The control apparatus 2 thereby acquires a relative position information between the reference position and each of the first tools T1 selected as the check target, the tool shape information of the first tool T1, a relative position information between the reference position and the first tool holder TH1 to which the first tool T1 is attached, and the holder shape information of the first tool holder TH1 (Step S22). The movement of the second headstock 6 can be controlled at higher speed since the set-up check process does not require high accuracy of the tool position information and the tool shape information of the first tool T1.

The control apparatus 2 then determines whether the second headstock 6 normally moves as specified in the measurement program and the measurement data is normal (Step S23). In the case that the second headstock 6 abnormally moves or any abnormal data exists such as a skip, a lack, and an abnormal irregularity (NO in Step S23), the control apparatus 2 displays an error message on the display unit 23 (Step S231) and terminates the set-up check process. Alternatively, the control apparatus 2 may repeat Steps S21 and S22 by the number of repeats specified in the measurement program. When the "NO" in Step S23 exceeds the specified number of repeats, the control apparatus 2 may display the error message on the display unit 23. In the case that the second headstock 6 normally moves as specified and the measurement data is normal (YES in Step S23), the tool holder information acquiring unit 281 identifies the holder type of the first tool holder TH1 to which the first tool T1 is attached according to the holder position information and the holder shape information of the first tool holder TH1 acquired by the measurement. The tool information acquiring unit 282 identifies the tool type of the first tool T1 and the tool number, which is the tool attaching position information, according to the tool position information and the tool shape information of the first tool T1 acquired by the measurement (Step S24). The tool holder information acquiring unit 281 acquires the holder type information, the holder shape information, and the holder property information of the identified first tool holder TH1 from the tool holder information storage unit 242. The tool information acquiring unit 282 acquires the tool type information and the tool shape information of the identified first tool T1 from the tool information storage unit 243. When the first tool T1 is a turning tool, the tool projecting length calculating unit 284 calculates a distance from the tool attaching surface of the first tool post 5 or second tool post 7 to the edge of the tool. When the first tool T1 is a rotary tool, the tool projecting length calculating unit 284 calculates the projecting length of the rotary tool from the first tool holder TH1 and the tool diameter of the rotary tool totally from the holder property information acquired by the tool holder information acquiring unit 281, the tool shape information acquired by the tool information acquiring unit 282, and the position information and the shape information acquired in Step S22 (Step S25).

The attaching tool check unit 286 compares the attaching tool information of the first tool T1 according to the past measurement result with the attaching tool information of the first tool T1 according to the current measurement result (Step S26). In other words, the attaching tool check unit 286 checks whether the tool type information, the projecting length, and the tool diameter of the past measurement result matches those of the current measurement result regarding the first tool T1 having the same tool number. The attaching tool check unit 286 performs the check on all of the first tools T1 that the operator has selected as the check target. In the case at least one of the first tools T1 do not match (NO in Step S26), the control apparatus 2 displays an error message on the display unit 23 (Step S261) identifying the tool along with mismatch information, and then terminates the set-up check process. In the case all of the first tools TH match (YES in Step S26) or when the operator has selected none as the check target, the control apparatus 2 displays a success message on the display unit 23 along with an inquiry whether to save the attaching tool information of the current measurement (Step S27). In the case that the operator selects saving it through the operating unit 22 (YES in Step S28), the control apparatus 2 stores the current information in the attaching tool information storage unit 244 (Step S29) and then terminates the set-up check process. In the case that the operator selects not saving it (NO in Step S28), the control apparatus 2 immediately terminates the set-up check process without storing the current information.

Figure 9:
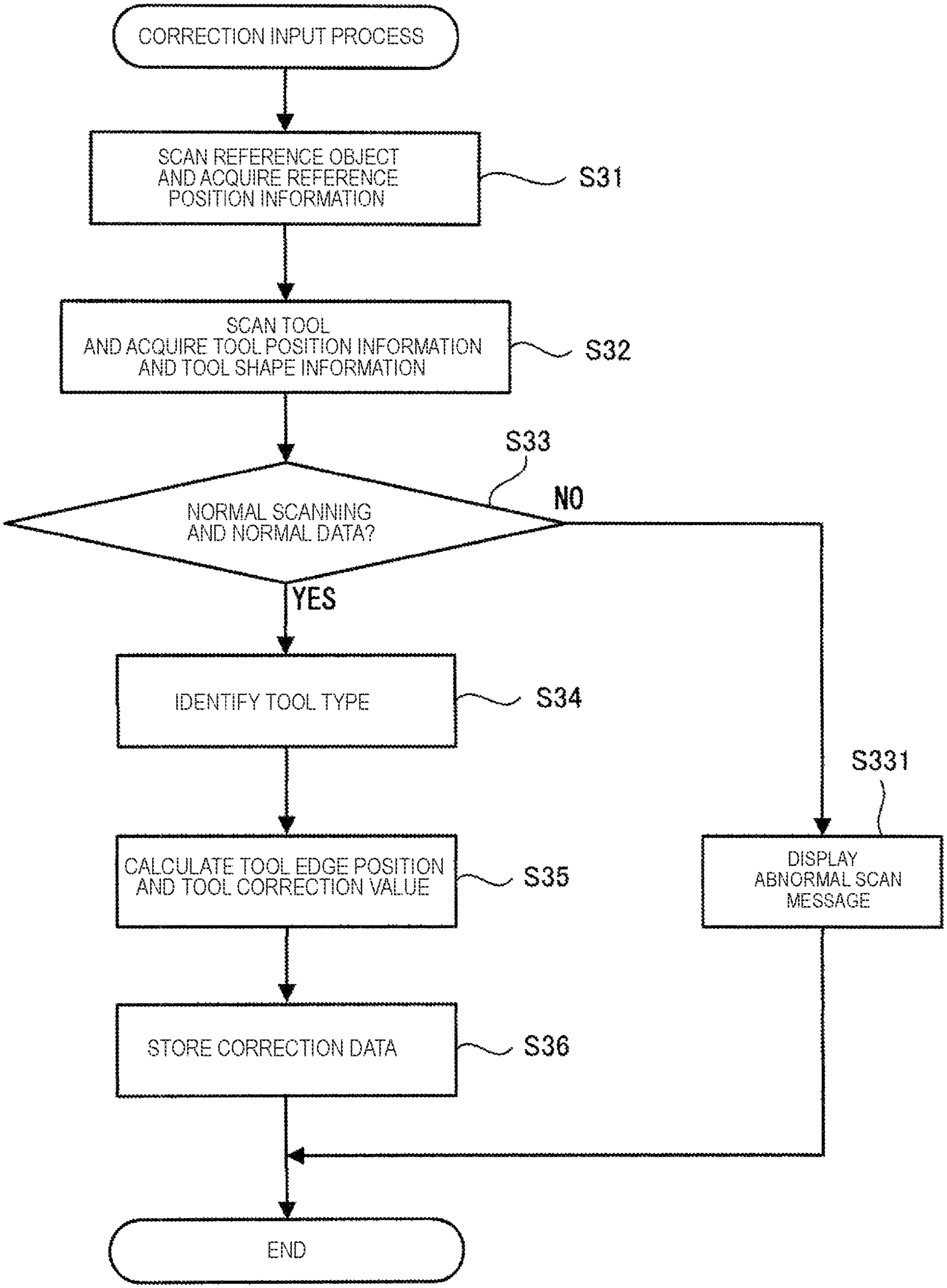
FIG. 9 is a flowchart of the correction input process shown in FIG. 6.

FIG. 9 is a flowchart of the correction input process shown in FIG. 6. FIG. 8B is a list of a tool correction value acquired in the correction input process. The tool correction information storage unit 245 may actually store the correction values of so many tools as corresponding to the tool attaching positions of the first tool post 5 and the second tool post 7. FIG. 8B simply shows part of them.

As shown in FIG. 9, the numerical control unit 27 controls the movement of the second headstock 6 to bring the scanner 9 in front of the reference object. The scanner 9 measures the position and the shape of the object while the second headstock 6 moves. The control apparatus 2 acquires a reference position information of a particular reference position of the reference object (Step S31). The reference object and the reference position are specified in the measurement program. In this embodiment, the guide bush 4 is specified as the reference object. An intersection point of the first spindle axis CL1 and an end surface of the guide bush 4 exposed in the cutting chamber 11 is specified as the reference position. The guide bush does not move in the X-axis, the Y-axis, nor Z-axis direction. The reference position can be of higher accuracy compared with the case that the moving member such as the tool post is specified as the reference object. Upon acquisition of the reference position information, the numerical control unit 27 controls the movement of the second headstock 6 at least in the X2-axis direction while operating the scanner 9. The control apparatus 2 thereby acquires a relative position information between the reference position and each of the first tool posts T1 and the tool shape information (Step S32). The movement of the second headstock 6 is controlled at lower speed to acquire the tool position information and the tool shape information with higher accuracy.

The control apparatus 2 then determines whether the second headstock 6 normally moves as specified in the measurement program and the measurement data is normal (Step S33). In the case that the second headstock 6 abnormally moves or any abnormal data exists such as a skip, a lack, and an abnormal irregularity (NO in Step S33), the control apparatus 2 displays an error message on the display unit 23 (Step S331) and terminates the correction input process. Alternatively, the control apparatus 2 may repeat Steps S31 and S32 by the number of repeats specified in the measurement program. When the "NO" in Step S33 exceeds the specified number of repeats, the control apparatus 2 may display the error message on the display unit 23. In the case that the second headstock 6 normally moves as specified and the measurement data is normal (YES in Step S33), the tool information acquiring unit 282 identifies the tool type of the attaching tool and the tool number, which is the tool attaching position information, according to the tool position information and the tool shape information acquired by the measurement (Step S34). The tool correction value calculating unit 287 calculates the tool edge position according to the tool position information and the tool shape information measured by the scanner 9 and the tool type information identified by the tool information acquiring unit 282. The tool correction value calculating unit 287 then calculates the tool correction value according to the calculated tool edge position (Step S35). The tool information storage unit 243 stores a reference edge position information in association with the tool type information. The tool correction value calculating unit 287 compares the calculated tool edge position with the stored reference tool edge position to calculate the tool correction value. Finally, the tool correction value calculating unit 287 stores the calculated tool correction value in the tool correction information storage unit 245 in association with the tool number (Step S36), displays the message representing completion of storage on the display unit 23, and then terminates the correction input process. As shown in FIG. 8B, the tool correction information storage unit 245 stores the X-axis, the Y-axis, and the Z-axis tool correction values in B2 to B4 columns respectively for every tool number in B1 column.

Figure 10:
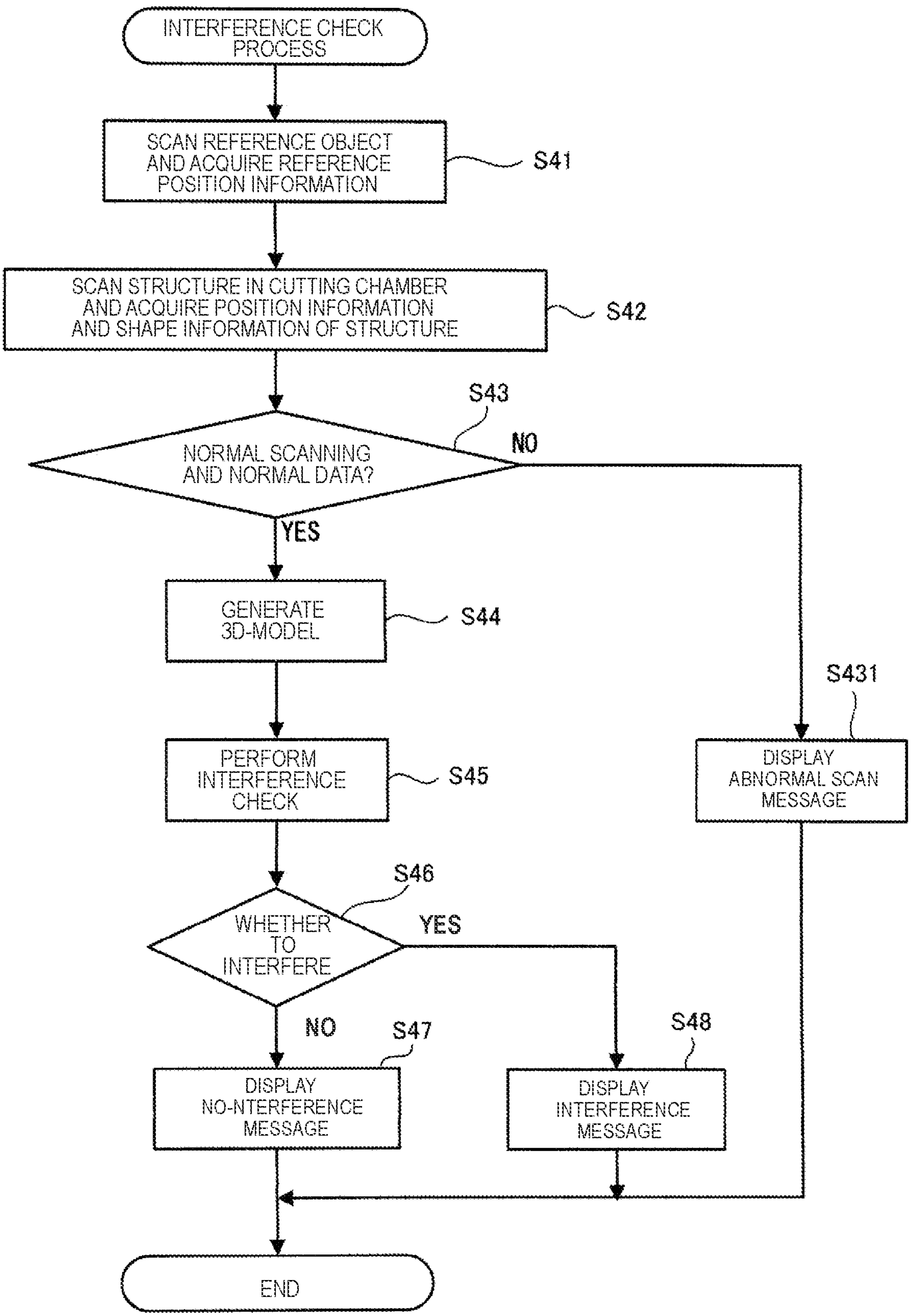
FIG. 10 is a flowchart of an interference check process shown in FIG. 6.
Figure 11:
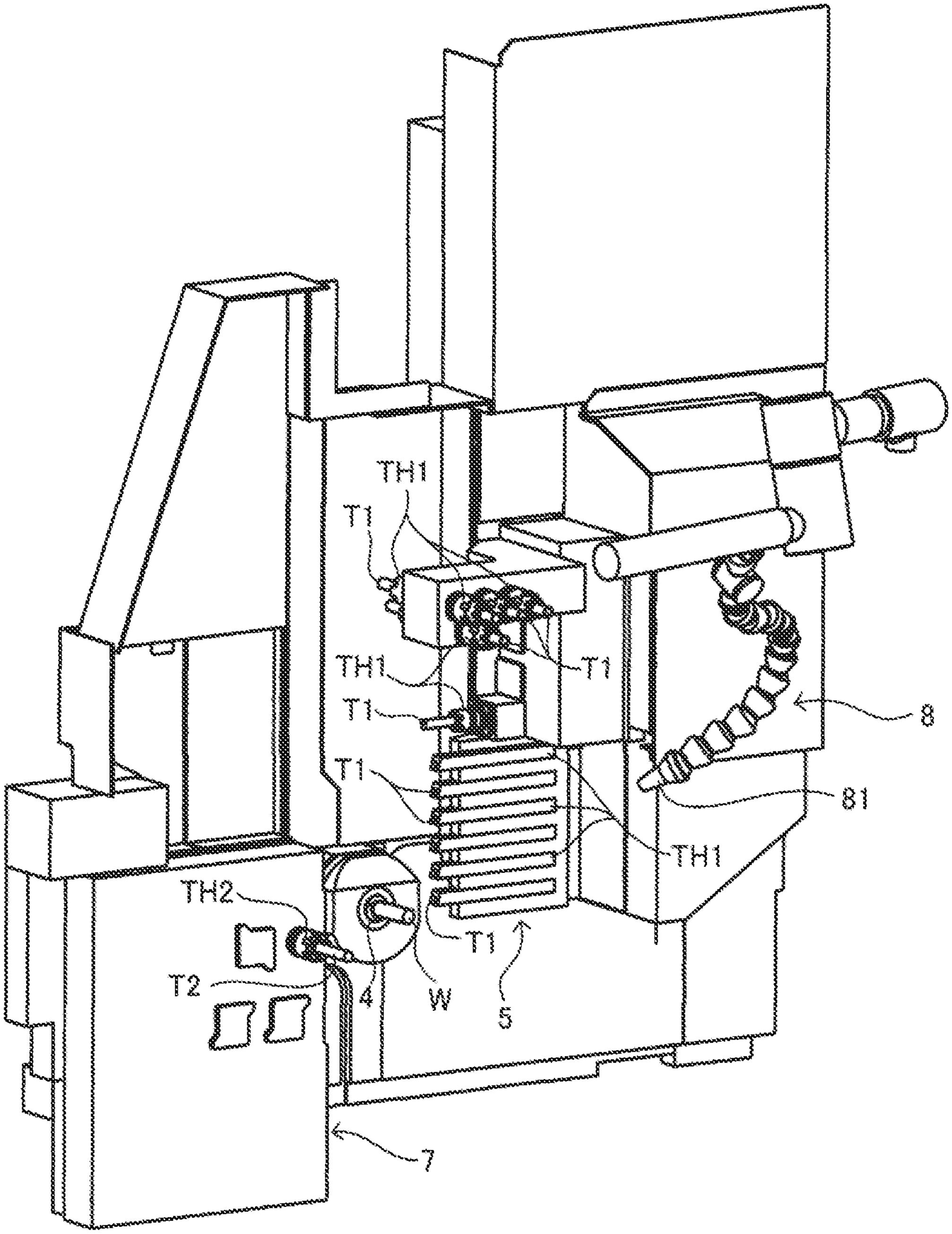
FIG. 11 is a perspective view of an imaginary three-dimensional model generated in an imaginary space through the interference check process.

FIG. 10 is a flowchart of the interference check process shown in FIG. 6. FIG. 11 is a perspective view of the imaginary three-dimensional model generated in the imaginary space.

As shown in FIG. 10, the numerical control unit 27 controls the movement of the second headstock 6 to bring the scanner 9 in front of the reference object. The scanner 9 measures the position and the shape of the object while the second headstock 6 moves. The control apparatus 2 acquires a reference position information of a particular reference position of the reference object (Step S41). The reference object and the reference position are specified in the measurement program. In this embodiment, the guide bush 4 is specified as the reference object. An intersection point of the first spindle axis CL1 and an end surface of the guide bush 4 exposed in the cutting chamber 11 is specified as the reference position. Upon acquisition of the reference position information, the numerical control unit 27 controls the movement of the second headstock 6 at least in the X2-axis direction while operating the scanner 9. The control apparatus 2 thereby acquires a relative position information of the structures in the cutting chamber 11 such as the tool and the first tool post 5 and the structure shape information (Step S42). The movement of the second headstock 6 is controlled at lower speed than in the correction input process and at higher speed than in the set-up check process to acquire the structure position information and the structure shape information with rather higher accuracy.

The control apparatus 2 then determines whether the second headstock 6 normally moves as specified in the measurement program and the measurement data is normal (Step S43). In the case that the second headstock 6 abnormally moves or any abnormal data exists such as a skip, a lack, and an abnormal irregularity (NO in Step S43), the control apparatus 2 displays an error message on the display unit 23 (Step S431) and terminates the interference check process. Alternatively, the control apparatus 2 may repeat Steps S41 and S42 by the number of repeats specified in the measurement program. When the "NO" in Step S43 exceeds the specified number of repeats, the control apparatus 2 may display the error message on the display unit 23. In the case that the second headstock 6 normally moves as specified and the measurement data is normal (YES in Step S43), the 3D-model generating unit 288 generates the imaginary three-dimensional model of the structure in the imaginary space according to the structure position information and the structure shape information acquired in Step S42 (Step S44). As shown in FIG. 11, the 3D-model generating unit 288 generates the imaginary three-dimensional model of the structure within the infrared radiation range of the scanner 9 mounted on the second headstock 6. The structure may include the guide bush 4, the first tool post 5 and the front tool unit, the second tool post 7 and the back tool unit, the coolant discharging unit 8, and part of the inner wall of the cutting chamber 11 (FIG. 1). The 3D-model generating unit 288 can generate the imaginary three-dimensional model of the workpiece W according to the inner diameter of the guide bush 4. Furthermore, the scanner 9 may be mounted on another moving member such as the first tool post 5 to acquire the structure position information and the structure shape information of the structure in the cutting chamber 11. The 3D-model generating unit 288 may generate the imaginary three-dimensional model from a combination of information provided from the scanner 9 mounted on the second headstock 6 and from another scanner 9 mounted on another moving member. The 3D-model generating unit 288 can then generate the imaginary three-dimensional model of the second headstock 6.

Upon completion of generation of the imaginary three-dimensional model, the interference check unit 289 moves the moving member such as the first tool post 5 of the imaginary three-dimensional model according to the NC program for use in an actual operation to check if an interference occurs between the moving members, between the moving member and the workpiece W, between the moving member and the coolant discharging unit 8, and between the moving member and the inner wall of the cutting chamber 11 (Step S45). The moving member may include the tool and the tool holder attached to any of the moving members. Upon completion of the movement of the imaginary three-dimensional model according to the NC program, the control apparatus 2 determines whether an interference occurs. In the case that an interference does not occur (NO in Step S46), the control apparatus 2 may display a message representing no-interference on the display unit 23 (Step S47) and then terminate the interference check process. In the case that an interference occurs (YES in Step S46), the control apparatus 2 may display a message representing the details of the interference (Step S48) and then terminate the interference check process.

As described above, the scanner 9 can measure the tool position and the tool shape actually attached to the first tool post 5 or the second tool post 7. The acquired tool position information and the acquired tool shape information can be utilized in the various processes including the interference check process. That removes a mismatch of the tool position and the tool shape between the check tool and the actual tool attached to the first tool post 5 or the second tool post 7, thus eliminating the need of verifying the check result with the tool actually attached to the first tool post 5 or the second tool post 7. Furthermore, the NC lathe 1 of the invention also generates the correction value information of the tool edge position from the tool position information and the tool shape information. The generated correction value information is automatically stored in the tool correction information storage unit 245, which reduces burden on the operator and also prevents a human input error.

The scanner 9 can measure the tool holder shape, too. The NC lathe 1 of the embodiment can accurately calculate the projecting length of the tool by using the property information of the tool holder. The NC lathe 1 can acquire the rotation direction of the rotary tool and check if the direction specified in the NC program is correct. In the set-up check process (Step S14, FIG. 7), the attaching tool check unit 286 compares the past attaching tool information with the current attaching tool information to check if a desired tool is attached in a desired state. That facilitates the verification of the tool type and the tool attaching position. In the interference check process (Step S17, FIG. 10), the NC lathe 1 generates the imaginary three-dimensional model from the measurement of the position and the shape of the coolant discharging unit 8 having the coolant nozzle 81. That facilitates the interference check between the moving member and the coolant discharging unit 8 to prevent an influence on the discharging angle and the position of the coolant nozzle 81. The scanner 9 mounted on the second headstock 6 movable in the X2-axis direction can measure the wide range. The scanner 9 can be removed from the second headstock 6 to prevent a failure of the scanner due to scattered coolant and chips during machining. The operation of the switch 94 allows the scanner 9 to send a signal representing on what moving member the scanner is mounted. The control apparatus 2 can thereby automatically determine on which moving member the scanner 9 is mounted.

A modified embodiment is being described. Any same element as the one described above is being denoted by the same reference number and any overlapping description may be omitted.

Figure 12:
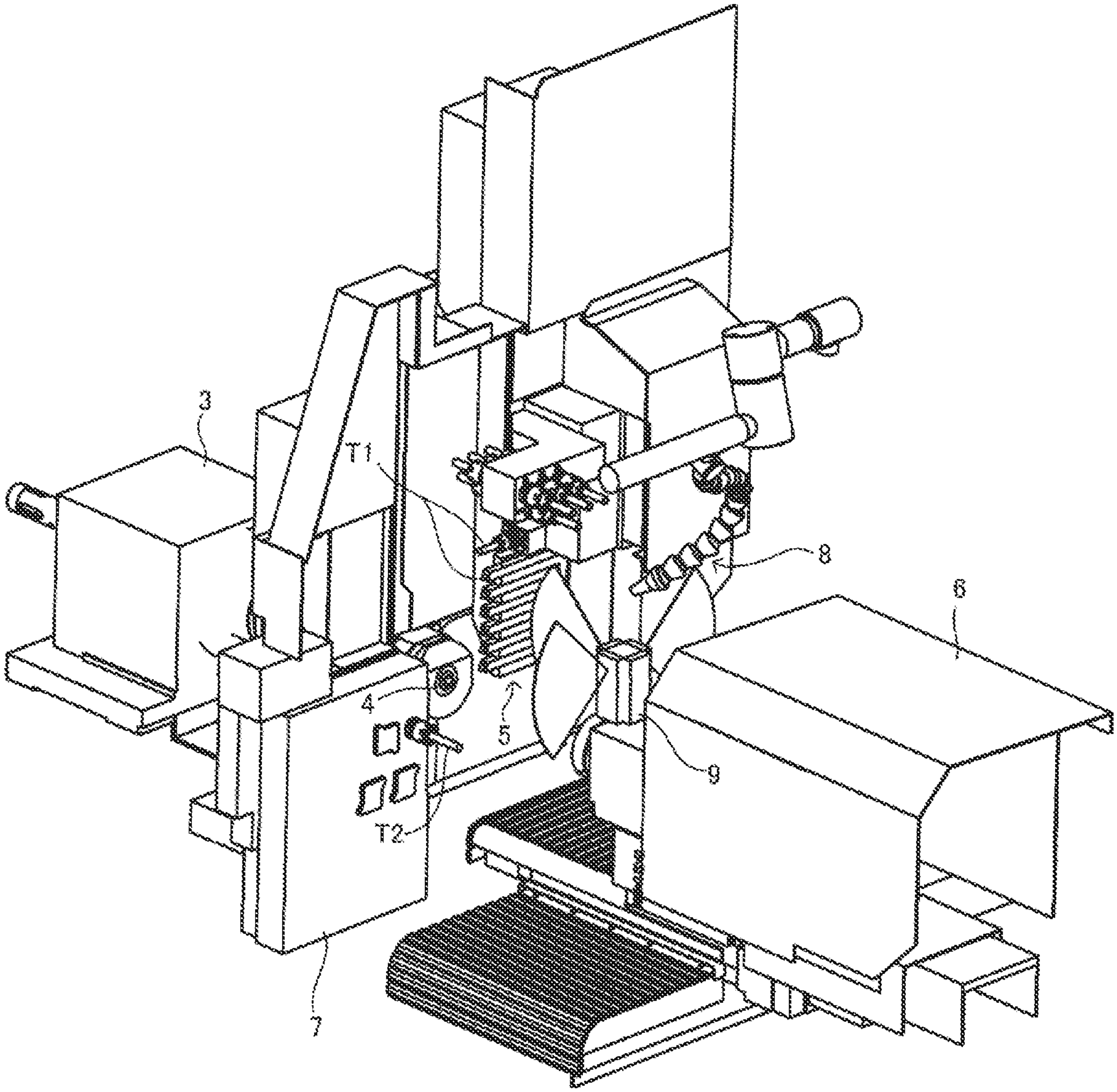
FIG. 12 is a perspective view similar to FIG. 2 showing the internal configuration of an NC lathe of a modified embodiment.

FIG. 12 is a perspective view similar to FIG. 2 showing the internal configuration of the NC lathe of the modified embodiment. The leg 10 is not shown.

The scanner 9 of the modified embodiment can make infrared radiation in three directions to measure the distances in the three directions, respectively. FIG. 12 shows the radiation ranges by three outlined fan shapes. The direction of radiation in the first embodiment is a single direction from the second headstock 6 toward the first headstock 3. Then, the measurement of an object outside the radiation range is only available when the scanner 9 is mounted on another moving member such as the first tool post 5 or the second tool post 7 or when a plurality of scanners 9 are mounted on a plurality of moving members to make infrared radiation in different directions, respectively. The tri-directional infrared radiation of the modified embodiment can measure the range even outside the unidirectional radiation range without re-mounting the scanner or mounting a plurality of scanners.

The invention can be embodied in various modifications within the scope of the invention. The invention may be applied to another machine tool such as a machining center. The scan result utilizing unit 28 may be entirely or partially provided in the computer connected to the NC lathe 1 by wire or wirelessly. The scanner 9 may be a three-dimensional scanner or a camera. The NC lathe 1 may be provided with an information delivering unit capable of delivering the attaching tool information and the tool correction value information to the CAM to prevent an input error when the operator uses the CAM. The CAM may include an interactive programming software, an automatic programing generating software, and any programming supporting software. The NC lathe 1 may further measure the position and the shape of the coolant nozzle 81 in Step S29 and store the measurement in the storage unit 24 in association with the attaching tool information. The NC lathe 1 may then compare and check the measurement of the coolant nozzle 81 in the set-up check process and display the result in the display unit 23. In the set-up check process, the tool type, the tool projecting length, and a threshold for determining a match of the tool diameter may be manually input through the operating unit 22. A threshold for determining a match of the position and the shape of the coolant nozzle 81 may be manually input through the operating unit 22. The operator can thereby set a desired threshold for determination.

Any element only described in one embodiment described above may be applied to the other embodiment.

What is claimed is:

1. A machine tool system comprising:

a tool post to which a tool for machining a workpiece is attached;

a numerical control unit adapted to control a movement of the tool post according to a numerical control program;

a measuring apparatus adapted to measure a position and a shape of the tool attached to the tool post;

a first spindle gripping the workpiece and rotatable around a spindle axis; and a headstock provided with a second spindle facing the first spindle, the headstock being movable in a first direction perpendicular to the spindle axis, wherein the measuring apparatus is mounted on the headstock to measure a distance to an object while moving in the first direction perpendicular to the spindle axis as the headstock moves, the distance to be measured being on a plane defined by a second direction perpendicular to the spindle axis and the direction of the spindle axis, the second direction being perpendicular to both the first direction perpendicular to the spindle axis and the spindle axis.

2. The machine tool system of claim 1, wherein the measuring apparatus further measures a shape of a tool holder for attaching the tool to the tool post, the machine tool system further comprising:

a tool holder information storing unit adapted to store a shape information of the tool holder in association with a property information of the tool holder for each of a plurality of the tool holders attachable to the tool post, and a holder information acquiring unit adapted to identify the shape information of the tool holder corresponding to the shape measured by the measuring apparatus among the shape information of the plurality of the tool holders stored in the tool holder information storing unit and then acquire the property information of the tool holder stored in association with the identified shape information of the tool holder.

3. The machine tool system of claim 1 further comprising:

an attaching tool information storing unit adapted to store an attaching tool information according to the position and the shape of the tool measured by the measuring apparatus; and an attaching tool check unit adapted to compare the attaching tool information stored in the attaching tool information storing unit with an attaching tool information acquired from the position and the shape of the tool newly measured by the measuring apparatus to determine whether the tool that is desired is attached to the tool post.

4. The machine tool system of claim 2 further comprising:

an attaching tool information storing unit adapted to store an attaching tool information according to the position and the shape of the tool measured by the measuring apparatus; and an attaching tool check unit adapted to compare the attaching tool information stored in the attaching tool information storing unit with an attaching tool information acquired from the position and the shape of the tool newly measured by the measuring apparatus to determine whether the tool that is desired is attached to the tool post.

5. The machine tool system of claim 1, wherein the measuring apparatus further measures a position and a shape of a coolant nozzle whose position and a coolant discharging angle is adjustable, the machine tool system further comprising:

an interference check unit adapted to generate an imaginary three-dimensional model by using the position and the shape of the coolant nozzle measured by the measuring apparatus and the position and the shape of the tool measured by the measuring apparatus to perform an interference check between the tool and the coolant nozzle by moving the tool post of the imaginary three-dimensional model according to the numerical control program.

6. The machine tool system of claim 2, wherein the measuring apparatus further measures a position and a shape of a coolant nozzle whose position and a coolant discharging angle is adjustable, the machine tool system further comprising:

an interference check unit adapted to generate an imaginary three-dimensional model by using the position and the shape of the coolant nozzle measured by the measuring apparatus and the position and the shape of the tool measured by the measuring apparatus to perform an interference check between the tool and the coolant nozzle by moving the tool post of the imaginary three-dimensional model according to the numerical control program.

7. The machine tool system of claim 3, wherein the measuring apparatus further measures a position and a shape of a coolant nozzle whose position and a coolant discharging angle is adjustable, the machine tool system further comprising:

an interference check unit adapted to generate an imaginary three-dimensional model by using the position and the shape of the coolant nozzle measured by the measuring apparatus and the position and the shape of the tool measured by the measuring apparatus to perform an interference check between the tool and the coolant nozzle by moving the tool post of the imaginary three-dimensional model according to the numerical control program.

8. The machine tool system of claim 4, wherein the measuring apparatus further measures a position and a shape of a coolant nozzle whose position and a coolant discharging angle is adjustable, the machine tool system further comprising:

an interference check unit adapted to generate an imaginary three-dimensional model by using the position and the shape of the coolant nozzle measured by the measuring apparatus and the position and the shape of the tool measured by the measuring apparatus to perform an interference check between the tool and the coolant nozzle by moving the tool post of the imaginary three-dimensional model according to the numerical control program.

9. The machine tool system of claim 1, wherein the measuring apparatus is removably mounted on the headstock, and when the measuring apparatus is mounted on the headstock, it sends a signal representing that the measuring apparatus is mounted on the headstock.

* * * * *